United States Patent
Lee et al.

(10) Patent No.: US 10,286,645 B2
(45) Date of Patent: May 14, 2019

(54) THREE-DIMENSIONAL PRINTING APPARATUS AND METHOD FOR COMPENSATING COORDINATE OFFSET BETWEEN NOZZLES THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yang-Teh Lee, New Taipei (TW); Kwan Ho, New Taipei (TW); Chi-Wen Hsieh, New Taipei (TW); Yu-Chuan Chang, New Taipei (TW); Chi-Chieh Wu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 655 days.

(21) Appl. No.: 14/542,652

(22) Filed: Nov. 16, 2014

(65) Prior Publication Data
US 2016/0059491 A1 Mar. 3, 2016

(30) Foreign Application Priority Data
Sep. 3, 2014 (TW) .............................. 103130424 A

(51) Int. Cl.
*B29C 67/00* (2017.01)
*B33Y 50/02* (2015.01)
(Continued)

(52) U.S. Cl.
CPC ............ *B33Y 50/02* (2014.12); *B29C 64/106* (2017.08); *B29C 64/393* (2017.08); *B33Y 10/00* (2014.12); *B33Y 30/00* (2014.12)

(58) Field of Classification Search
CPC ............ B29C 67/0051; B29C 67/0055; B29C 67/0088; B33Y 50/02
(Continued)

(56) References Cited

U.S. PATENT DOCUMENTS 6,259,962 B1    7/2001   Gothait
9,193,157 B2 *  11/2015  Libinson ............. B29C 67/0059
(Continued)

FOREIGN PATENT DOCUMENTS

CN    1788998      6/2006
CN    101060990    10/2007
TW    201334984    9/2013

OTHER PUBLICATIONS

"Office Action of Taiwan Counterpart Application", dated Aug. 5, 2016, p. 1-p. 7.
(Continued)

*Primary Examiner* — Joseph S Del Sole
*Assistant Examiner* — Thu Khanh T Nguyen
(74) *Attorney, Agent, or Firm* — JCIPRNET

(57) ABSTRACT

A three-dimensional printing apparatus and a method of compensating a coordinate offset of a nozzle are provided. The method includes the following. A first nozzle and a second nozzle are controlled to print a testing three-dimensional object on a platform according to a calibration model. The testing three-dimensional object includes a plurality of correlation structures respectively corresponding to a plurality of compensation parameters, and each correlation structure includes a first sub-structure and a second sub-structure. The first sub-structure is formed of a first forming (Continued)

material, and the second sub-structure is formed of a second forming material. Through observing a joint level between the first sub-structure and the second sub-structure of each correlation structure, a best correlation structure, which is used for performing compensation on a printing coordinate of the first nozzle or the second nozzle, is selected from the correlation structures.

11 Claims, 6 Drawing Sheets

(51) Int. Cl.
    *B33Y 10/00*     (2015.01)
    *B33Y 30/00*     (2015.01)
    *B29C 64/106*     (2017.01)
    *B29C 64/393*     (2017.01)

(58) Field of Classification Search
    USPC ............................... 425/174.4, 375; 700/119
    See application file for complete search history.

(56) References Cited

U.S. PATENT DOCUMENTS

| | | | |
|---|---|---|---|
| 9,205,690 B2* | 12/2015 | Leavitt | B29C 67/0055 |
| 9,550,324 B2* | 1/2017 | Lee | B29C 67/0088 |
| 2006/0066879 A1 | 3/2006 | Bast et al. | |
| 2006/0111807 A1 | 5/2006 | Gothait et al. | |
| 2010/0110133 A1 | 5/2010 | Yoshida | |

OTHER PUBLICATIONS

"Office Action of China Counterpart Application", dated Mar. 27, 2017, p. 1-p. 11.
"Office Action of China Counterpart Application," dated Mar. 12, 2018, p. 1-p. 13.
"Office Action of Taiwan Counterpart Application," dated Jul. 23, 2018, pp. 1-9.

* cited by examiner

THREE-DIMENSIONAL PRINTING APPARATUS AND METHOD FOR COMPENSATING COORDINATE OFFSET BETWEEN NOZZLES THEREOF

CROSS-REFERENCE TO RELATED APPLICATION

This application claims the priority benefit of Taiwan application serial no. 103130424, filed on Sep. 3, 2014. The entirety of the above-mentioned patent application is hereby incorporated by reference herein and made a part of this specification.

BACKGROUND

1. Technical Field

The technical field relates to a printing apparatus and more particularly relates to a three-dimensional printing apparatus and a method of compensating a coordinate offset between nozzles thereof.

2. Description of Related Art

With the progress in computer-aided manufacturing (CAM), manufacturers have developed the technology of three-dimensional (3-D) printing for rapidly embodying an original design concept. In fact, the 3-D printing technology is a collective term referring to a series of rapid prototyping (RP) techniques, and the basic principle is laminate manufacture, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is applicable regardless of the geometric shapes and the RP technology produces excellent outputs in particular for complex parts, which saves efforts and processing time significantly. The 3-D printing technology is capable of presenting an object of a digital 3-D model designed by means of computer-aided design (CAD) software in less time for the user to touch and actually feel the geometry of the model, or even to test the assemblability of the parts and possible functions.

Currently, most three-dimensional printing apparatuses, which utilize the rapid prototyping (RP) technique to form a three-dimensional object, use a material feeding mechanism to supply a hot melt forming material to the nozzle and then heat and melt the material by means of a material heating structure and the nozzle, so as to apply the hot melt forming material layer by layer on the platform to form the three-dimensional object. In order to improve the practicality of the three-dimensional printing apparatus and the diversity of the three-dimensional objects, manufacturers in this field start developing a printing head module with multiple nozzles, and the nozzles can alternately apply different forming materials or forming materials of different colors onto the platform. However, for the printing head module with multiple nozzles, the nozzles may be displaced from the predetermined positions due to various factors such as assembly errors of the factory or usage. As a result, the relative positions of the nozzles may be offset. The offset error of the nozzles may cause improper bonding, such as displacement and overlap, of the joint between different forming materials. For this reason, the three-dimensional object may not be printed as expected, and the printing quality and printing yield of the three-dimensional printing apparatus are reduced.

SUMMARY

In view of the above, the invention provides a three-dimensional printing apparatus and a method of compensating a coordinate offset between nozzles thereof, for compensating and calibrating an offset error between the nozzles, thereby improving the printing quality of the three-dimensional printing apparatus.

A method of compensating a coordinate offset of a nozzle is provided. This method is adapted for a three-dimensional printing apparatus that includes a platform, a first nozzle, and a second nozzle. The first nozzle is configured to feed a first forming material and the second nozzle is configured to feed a second forming material. The coordinate offset compensating method includes the following steps. A calibration model associated with a plurality of compensation parameters is received. Each of the compensation parameters corresponds to an offset value between the first nozzle and the second nozzle under a reference printing coordinate. The first nozzle and the second nozzle are controlled to print a testing three-dimensional object on the platform according to the calibration model. The testing three-dimensional object includes a plurality of correlation structures respectively corresponding to the compensation parameters, and each correlation structure includes a first sub-structure and a second sub-structure. The first sub-structure is formed of the first forming material, and the second sub-structure is formed of the second forming material. One of the compensation parameters, which corresponds to one of the correlation structures, is selected according to a joint level between the first sub-structure and the second sub-structure of the correlation structure. The reference printing coordinate of the first nozzle or the second nozzle is compensated according to one of the compensation parameters selected according to the testing three-dimensional object.

From another aspect, a three-dimensional printing apparatus is provided, which includes a platform, a printing module, and a controller coupled to the printing module. The platform includes a carrier surface. The printing module is disposed above the platform and includes a first nozzle, a second nozzle, and a base. The first nozzle is configured to feed a first forming material and the second nozzle is configured to feed a second forming material. The base carries the first nozzle and the second nozzle and is configured to move along a reference plane and along a normal direction of the reference plane. The controller receives a calibration model which is associated with a plurality of compensation parameters. Each of the compensation parameters corresponds to an offset value between the first nozzle and the second nozzle under a reference printing coordinate. The controller controls the printing module to print a testing three-dimensional object on the platform according to the calibration model. The testing three-dimensional object includes a plurality of correlation structures respectively corresponding to the compensation parameters, and each of the correlation structures includes a first sub-structure and a second sub-structure. The controller controls the first nozzle to stack the first forming material layer by layer on the platform to form the first sub-structure of each correlation structure and controls the second nozzle to stack the second forming material layer by layer on the platform to form the second sub-structure of each correlation structure. Further, a best compensation parameter of the compensation parameters is determined according to a joint level between the first sub-structure and the second sub-structure of each correlation structure. When the controller obtains the best compensation parameter, the controller calibrates a printing coordinate of the first nozzle or the second nozzle according to the best compensation parameter selected based on the testing three-dimensional object.

Based on the above, in one of the embodiments of the disclosure, a testing three-dimensional object is printed according to the preset calibration model first, and the testing three-dimensional object includes a plurality of correlation structures. The correlation structures are respectively formed using different forming materials, and the different forming materials are respectively fed and applied on the platform through different nozzles. The correlation structures have different preset joint levels according to the calibration model and respectively correspond to different compensation parameters. Thus, by observing the actual joint levels of the correlation structures, the offset between different nozzles can be determined, and the printing coordinates of the different nozzles can be calibrated and compensated according to the compensation parameter that conforms to the current condition.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
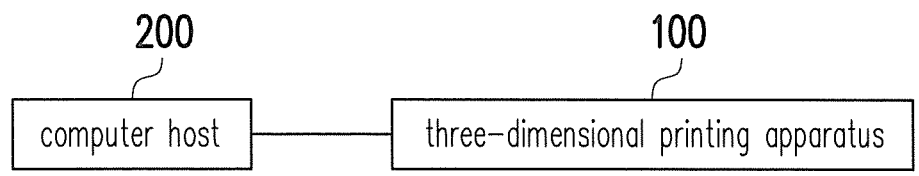
FIG. 1 is a block diagram illustrating a three-dimensional printing apparatus in a working scenario according to one of the exemplary embodiments.

It should be understood that the foregoing and other detailed descriptions, features, and effects are intended to be described more comprehensively by providing embodiments accompanied with drawings hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

FIG. 1 is a block diagram illustrating a three-dimensional printing apparatus in a working scenario according to one of the exemplary embodiments. With reference to FIG. 1, a three-dimensional printing apparatus 100 of this embodiment is adapted for printing a three-dimensional object according to three-dimensional model information. More specifically, a computer host 200 is a device having a computing function, which may be a computer device, such as a laptop computer, a tablet computer, and a desktop computer. The disclosure is not intended to limit the type of the computer host 200. The computer host 200 is capable of editing and processing a three-dimensional model of a three-dimensional object and transmitting the related three-dimensional model information to the three-dimensional printing apparatus 100 for the three-dimensional printing apparatus 100 to print the three-dimensional object according to the three-dimensional model information. In this embodiment, the three-dimensional model may be a digital three-dimensional image file, which is for example constructed by the computer host 200 by means of computer-aided design (CAD) or animation modeling software. The computer host 200 performs a slicing process on the three-dimensional model to obtain three-dimensional model information in association with multiple layer objects, such that the three-dimensional printing apparatus 100 prints the layer objects in sequence according to the three-dimensional model information corresponding to the layer objects, thereby forming the complete three-dimensional object.

Figure 2:
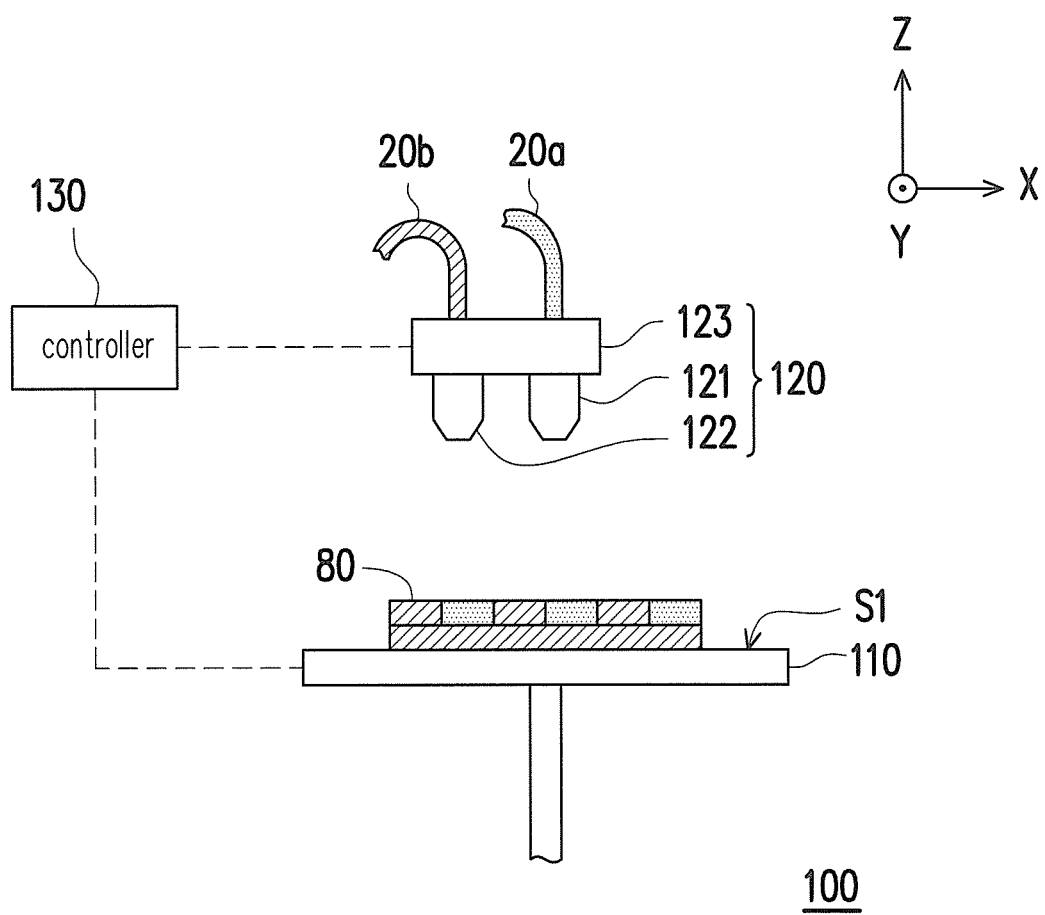
FIG. 2 is a schematic diagram illustrating a three-dimensional printing apparatus according to one of the exemplary embodiments.

FIG. 2 is a schematic diagram illustrating a three-dimensional printing apparatus according to one of the exemplary embodiments. With reference to FIG. 2, the three-dimensional printing apparatus 100 includes a platform 110, a printing module 120, and a controller 130, wherein a Cartesian coordinate system is provided for describing the related components and movements thereof. The platform 110 includes a carrier surface S1 for carrying a three-dimensional object 80 that is to be printed. The printing module 120 is disposed above the platform 110 and includes a first nozzle 121, a second nozzle 122, and a base 123. The first nozzle 121 is configured to feed a first forming material 20a, and the second nozzle 122 is configured to feed a second forming material 20b. The base 123 carries the first nozzle 121 and the second nozzle 122 and is configured to move along an XY plane and along a normal direction (a Z axis direction) of the XY plane. The base 123 is disposed movably above the platform 110, such that the first nozzle 121 and the second nozzle 122 apply the first forming material 20a and the second forming material 20b on the carrier surface S1 of the platform 110.

Moreover, the controller 130 is coupled to the platform 110 and the printing module 120 for reading the three-dimensional model information provided by the computer host 200 and controlling the entire operation of the three-dimensional printing apparatus 100 to print the three-dimensional object 80 according to the three-dimensional model information. For example, the controller 130 controls a movement path of the base 123 according to three-dimensional digital model information. The controller 130 is a device having a computing function, such as a central processing unit, a chip set, a microprocessor, an embedded controller, etc. Nevertheless, the disclosure is not limited thereto.

To be more specific, the controller 130 controls the base 123 to move above the platform 110 according to the three-dimensional model information, and controls a material feeding mechanism (e.g. a material feeding roller) to respectively feed the first forming material 20a and the second forming material 20b to the first nozzle 121 and the second nozzle 122. Thus, through control of the controller 130, the printing module 120 alternately applies the first forming material 20a and the second forming material 20b on the platform 110, so as to print the three-dimensional object 80 formed of the first forming material 20a and the second forming material 20b. In this embodiment, the first forming material 20a and the second forming material 20b may be a variety of materials suitable for fused filament fabrication (FFF) and melted and extrusion modeling. However, it should be noted that the disclosure is not limited thereto. In addition, the first forming material 20a and the second forming material 20b may be the same type of forming material with different colors. However, it should be noted that the disclosure is not limited thereto.

Figure 3A:
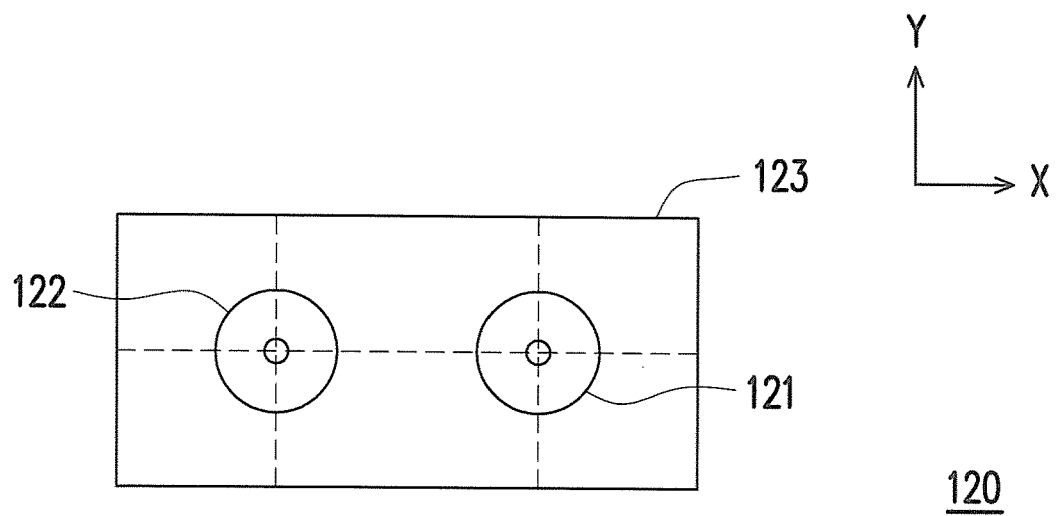
FIG. 3A is a schematic top view of a printing module with no offset error according to the embodiment of FIG. 2.

FIG. 3A is a schematic top view of the printing module 120 with no offset error according to the embodiment of FIG. 2. With reference to FIG. 3A, the first nozzle 121 and the second nozzle 122 are fixed on the base 123, and the controller 130 controls the movement of the base 123 on the XY plane to move the first nozzle 121 and the second nozzle 122 to suitable positions. Accordingly, the first nozzle 121 sprays and prints the first forming material 20a on a specific position, designated by the three-dimensional model information, on the platform 110, and the second nozzle 122 also sprays and prints the second forming material 20b on a specific position, designated by the three-dimensional model information, on the platform 110.

Figure 3B:
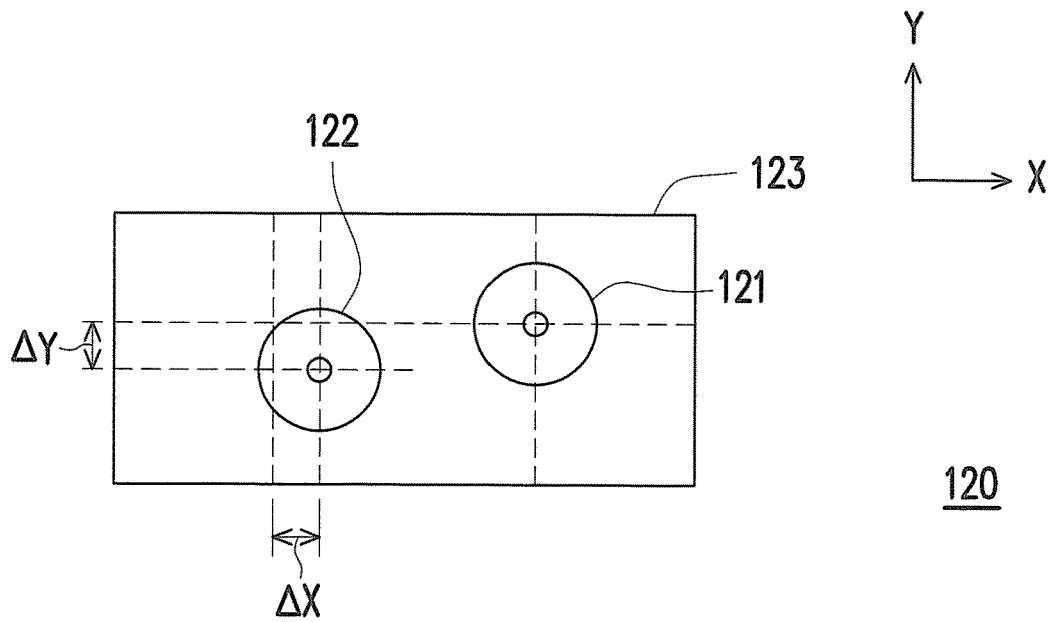
FIG. 3B is a schematic top view of a printing module with an offset error according to the embodiment of FIG. 2.

However, due to factors such as assembly errors of the factory or usage, relative positions of the first nozzle 121 and the second nozzle 122 may be offset. FIG. 3B is a schematic top view of the printing module 120 with an offset error according to the embodiment of FIG. 2. With reference to FIG. 3B, the second nozzle 122 in FIG. 3B may not be at a preset position due to assembly errors. As shown in FIG. 3B, the second nozzle 122 is offset in an X axis direction for a first offset ΔX and offset in a Y axis direction for a second offset ΔY. If the relative positions of the first nozzle 121 and the second nozzle 122 does not conform to a preset relationship due to the offset of the second nozzle 122, the controller 130 is not able to move the second nozzle 122 to a printing position designated by the three-dimensional printing information through controlling the base 123.

In one of the exemplary embodiments, the controller 130 receives and reads three-dimensional printing information of a calibration model and controls the printing module 120 to print a testing three-dimensional object on the platform 110 according to the three-dimensional printing information of the calibration model. In one of the exemplary embodiments, degrees of the offsets of the first nozzle 121 and the second nozzle 122 are obtained by observing a plurality of correlation structures of the testing three-dimensional object. Each of the correlation structures includes a first sub-structure and a second sub-structure, wherein the first sub-structure is formed of the first forming material 20a and the second sub-structure is formed of the second forming material 20b.

Figure 4:
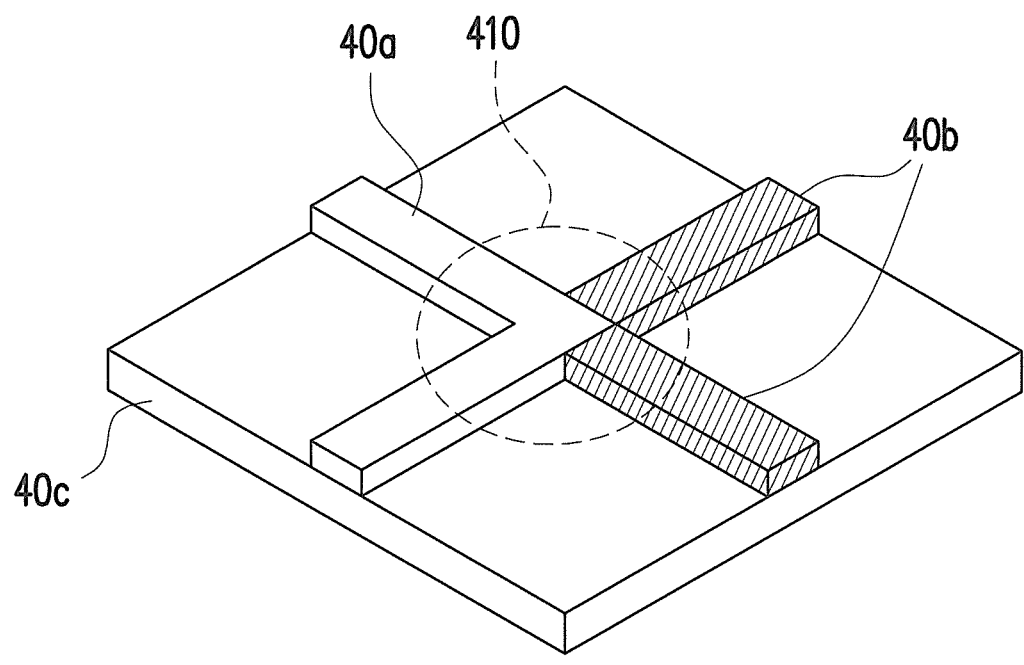
FIG. 4 is a schematic diagram illustrating an example of a testing three-dimensional object according to one of the exemplary embodiments.

To clearly explain the disclosure, FIG. 4 is a schematic diagram illustrating an example of the testing three-dimensional object according to one of the exemplary embodiments. In the example of FIG. 4, a testing three-dimensional object 40 includes only one correlation structure 410, which includes a first sub-structure 40a and a second sub-structure 40b. In addition, the testing three-dimensional object 40 of this example further includes a flat bottom plate 40c. However, it should be noted that FIG. 4 is merely one example and should not be construed to limit the disclosure. In other exemplary embodiments, the number of the correlation structures may be plural. Nevertheless, the disclosure is not limited thereto. Furthermore, an intersection pattern style of the first sub-structure and the second sub-structure may be modified according to the actual needs, and the disclosure is not intended to limit the intersection pattern style.

In order to obtain the actual offsets of the first nozzle 121 and the second nozzle 122, in one of the exemplary embodiments, the testing three-dimensional object includes a plurality of correlation structures respectively corresponding to a plurality of compensation parameters. More specifically, the controller 130 controls the first nozzle 121 to stack the first forming material 20a layer by layer on the platform 110, so as to form the first sub-structure of each correlation structure and controls the second nozzle 122 to stack the second forming material 20b layer by layer on the platform 110, so as to form the second sub-structure of each correlation structure.

It should be noted that the first sub-structure and the second sub-structure of each of the correlation structures has a relative position relationship that differs from each other according to calibration model information. Therefore, a preset joint level of the first sub-structure and the second sub-structure of each of the correlation structures also differs from each other. Thus, the offsets of the first nozzle 121 and the second nozzle 122 can be obtained by observing the joint level of each correlation structure that is actually printed out. More specifically, the three-dimensional printing apparatus 100 of this embodiment further includes an image capturing unit disposed above the platform 110. The controller 130 controls the image capturing unit to capture an image of the testing three-dimensional object on the platform 110 and identifies the joint level of each correlation structure through image processing and analysis. However, the disclosure is not intended to limit how the testing three-dimensional object is observed. In another embodiment, the joint level of each correlation structure may be identified by an operator of the three-dimensional printing apparatus 100.

In addition, in one of the exemplary embodiments, the first sub-structure includes a plurality of first layer objects, and the second sub-structure includes a plurality of second layer objects. The three-dimensional printing apparatus 100 forms the first sub-structure and the second sub-structure by printing layers of the first layer objects and layers of the second layer objects, so as to increase the accuracy of identifying the joint level of each correlation structure. For example, if the thickness of one layer object is set to 0.1 mm, it is difficult for the operator of the three-dimensional printing apparatus 100 to determine the joint level between the first sub-structure and the second sub-structure based on the first sub-structure and the second sub-structure respectively having the thickness of 0.1 mm. Moreover, if the first sub-structure and the second sub-structure include one layer object respectively, the one layer object may not accurately show the joint level of each correlation structure due to the pressing caused by the first nozzle 121 and the second nozzle 122 during the printing. In a preferred embodiment, the number of the first layer objects and the number of the second layer objects are greater than or equal to 10 respectively. For example, if the thickness of one layer object is set to 0.1 mm, and the number of the first layer objects and the number of the second layer objects are both 10, the operator is able to accurately identify the joint level between the first sub-structure and the second sub-structure based on the first sub-structure and the second sub-structure respectively having the thickness of 1 mm.

It should be noted that, in one of the exemplary embodiments, the controller 130 controls the first nozzle 121 to print a flat bottom plate (e.g. the flat bottom plate 40c as shown in FIG. 4) of the testing three-dimensional object on the platform 110 according to the calibration model information. More specifically, the three-dimensional printing apparatus 100 first prints the flat bottom plate of the testing three-dimensional object on the platform 110, and then the controller 130 respectively controls the first nozzle 121 and the second nozzle 122 to continue printing the first sub-structure and the second sub-structure that constitute each correlation structure on the flat bottom plate. The configuration of the flat bottom plate allows the operator to easily take out the testing three-dimensional object for observation.

Thus, a best compensation parameter among the compensation parameters is determined according to the joint level between the first sub-structure and the second sub-structure of each correlation structure. When the controller 130 obtains the best compensation parameter, the controller 130 uses the best compensation parameter to calibrate and compensate a printing coordinate of the first nozzle 121 or the second nozzle 122. In one of the exemplary embodiments, each compensation parameter includes a first vector compensation parameter corresponding to the X axis direction and a second vector compensation parameter corresponding to the Y axis direction, and the X axis direction and the Y axis direction are respectively perpendicular to the normal direction (the Z axis direction) of the platform 110.

In other words, after obtaining the best compensation parameter in association with the first nozzle 121 and the second nozzle 122, the controller 130 compensates and calibrates preset working coordinates of work to be performed by the first nozzle 121 and the second nozzle 122 according to the best compensation parameter, such that the first nozzle 121 and the second nozzle 122 move to correct working points to perform the work according to the calibrated working coordinates, thereby preventing assembly errors of the first nozzle 121 and the second nozzle 122 from affecting the yield and accuracy of performing the work.

It should be noted that the disclosure determines the best compensation parameter for calibrating the printing coordinates of the nozzles according to the joint level of each correlation structure. The disclosure does not limit cross-sectional shapes of the first sub-structure and the second sub-structure. Those skilled in the art can determine the cross-sectional shapes of the first sub-structure and the second sub-structure according to the above descriptions. Furthermore, the first sub-structure and the second sub-structure may be formed on the platform by different stacking methods. Therefore, a method of identifying the joint level of each correlation structure also differs according to the stacking methods. Two exemplary embodiments are given below to explain the disclosure in detail.

Figure 5A:
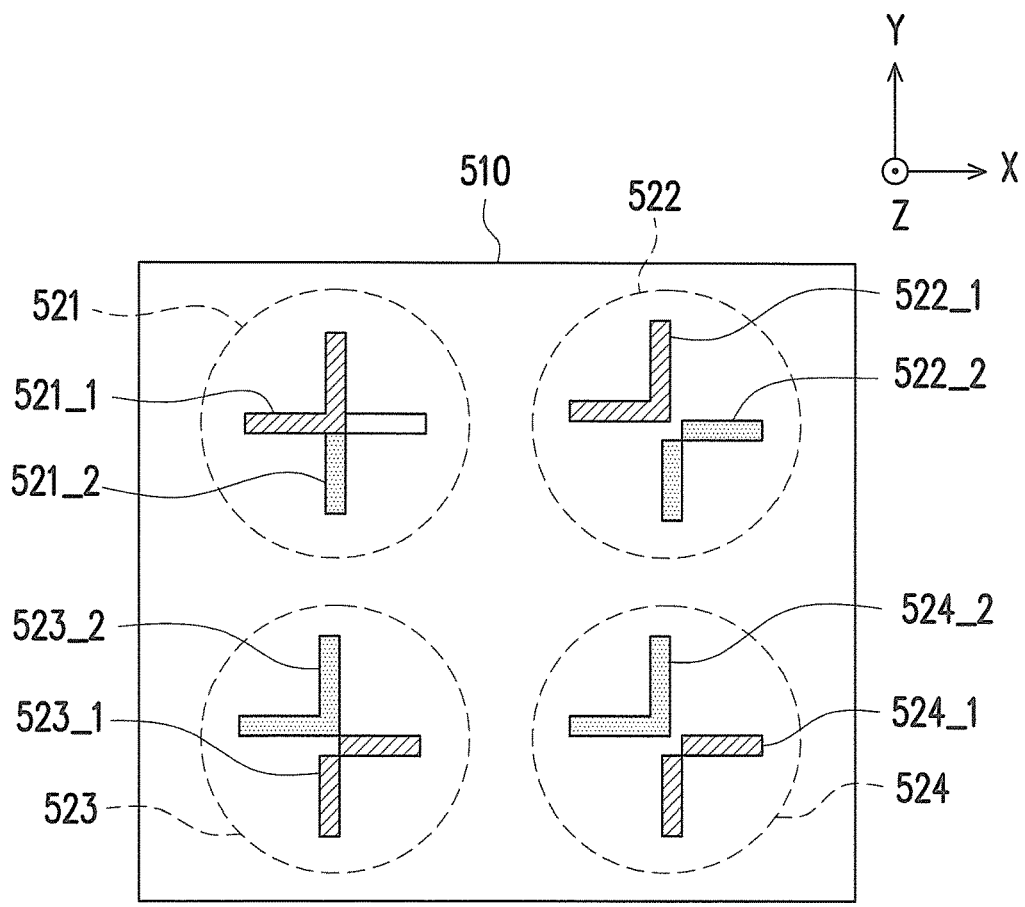
FIG. 5A is a schematic top view of a testing three-dimensional object according to one of the exemplary embodiments.

FIG. 5A is a schematic top view of a testing three-dimensional object according to one of the exemplary embodiments. With reference to FIG. 5A, in this example, it is given that a first cross-sectional pattern of a first sub-structure of a testing three-dimensional object 500 projected on the platform 110 is different from a second cross-sectional pattern of a second sub-structure of the testing three-dimensional object 500 projected on the platform 110, and the first sub-structure is adjacent to the second sub-structure and the first sub-structure and the second sub-structure are respectively stacked on the carrier surface S1 of the platform 110.

More specifically, with reference to FIG. 5A, the testing three-dimensional object 500 includes a plurality of correlation structures 521, 522, 523, and 524, and a flat bottom plate 510. The correlation structures 521-524 respectively include a first sub-structure 521_1, a first sub-structure 522_1, a first sub-structure 523_1, and a first sub-structure 524_1 formed of the first forming material 20a, and the correlation structures 521-524 respectively include a second sub-structure 521_2, a second sub-structure 522_2, a second sub-structure 523_2, and a second sub-structure 524_2 formed of the second forming material 20b. As shown in FIG. 5A, according to the preset calibration model, the first sub-structures and the second sub-structures of the correlation structures 521-524 have different joint levels, and the correlation structures 521-524 correspond to different compensation parameters. In an exemplary embodiment, the first sub-structures 521_1-524_1 and the second sub-structures 521_2-524_2 form rib structures that intersect each other on the flat bottom plate 510.

Thus, according to the joint levels of the correlation structures 521-524, one of the correlation structures 521-524, which has the highest joint level, is selected as the best correlation structure. In this example, because the correlation structure 521 has the highest joint level, the correlation structure 521 is deemed as the best correlation structure, and the printing coordinates of the first nozzle 121 and the second nozzle 122 are compensated and calibrated according to the compensation parameter corresponding to the correlation structure 521.

Figure 5B:
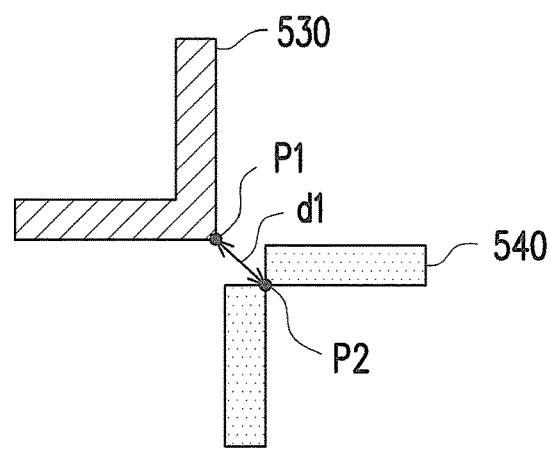
FIG. 5B is a schematic diagram illustrating determining a joint level of a correlation structure according to one of the exemplary embodiments.

FIG. 5B is a schematic diagram illustrating determining a joint level of a correlation structure according to one of the exemplary embodiments. With reference to FIG. 5B, in one of the exemplary embodiments, the controller 130 or the operator of the three-dimensional printing apparatus 100 determines the joint level between a first sub-structure 530 and a second sub-structure 540 of an correlation structure 580 according to a testing distance dl between a first reference point P1 of the first sub-structure 530 and a second reference point P2 of the second sub-structure 540, wherein the joint level of the correlation structure 580 increases as the testing distance dl decreases. It should be noted that the first reference point and the second reference point may be set according to the actual needs, and the disclosure is not intended to limit the setting of the first reference point and the second reference point. Those skilled in the art can determine suitable first reference point and second reference point according to the above descriptions.

Figure 6A:
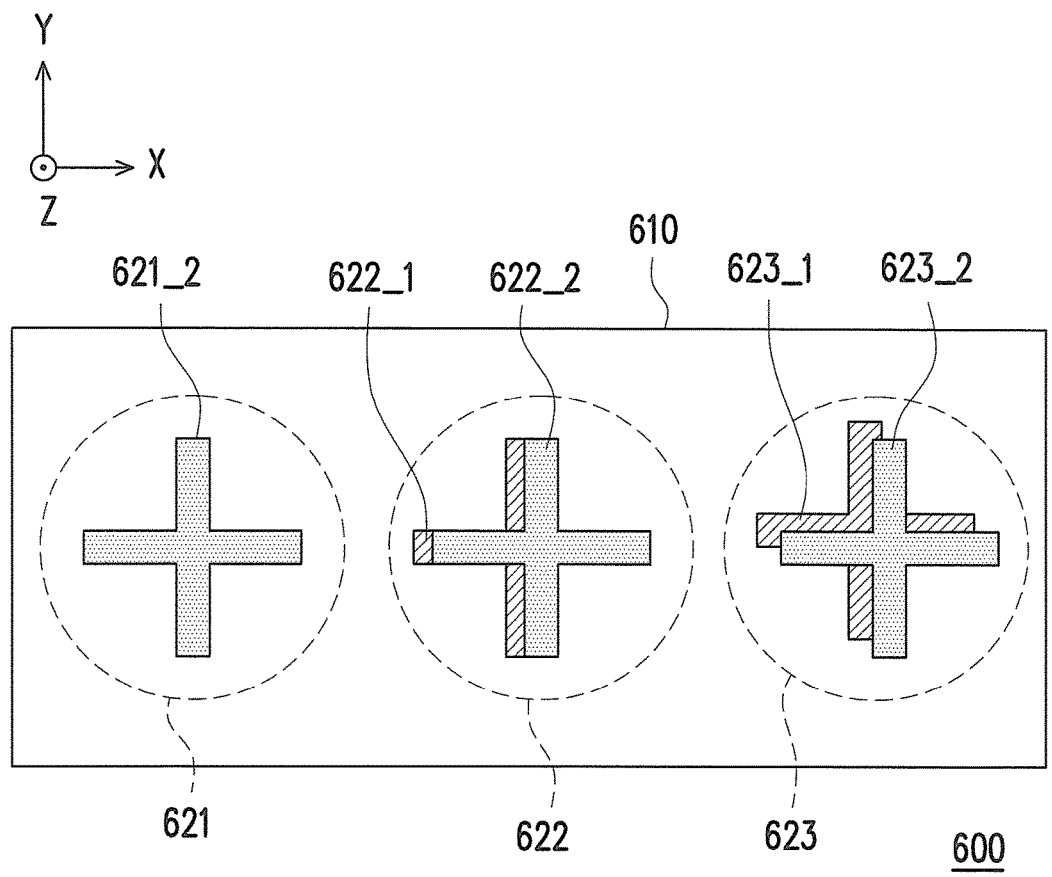
FIG. 6A is a schematic top view of a testing three-dimensional object according to one of the exemplary embodiments.
Figure 6B:
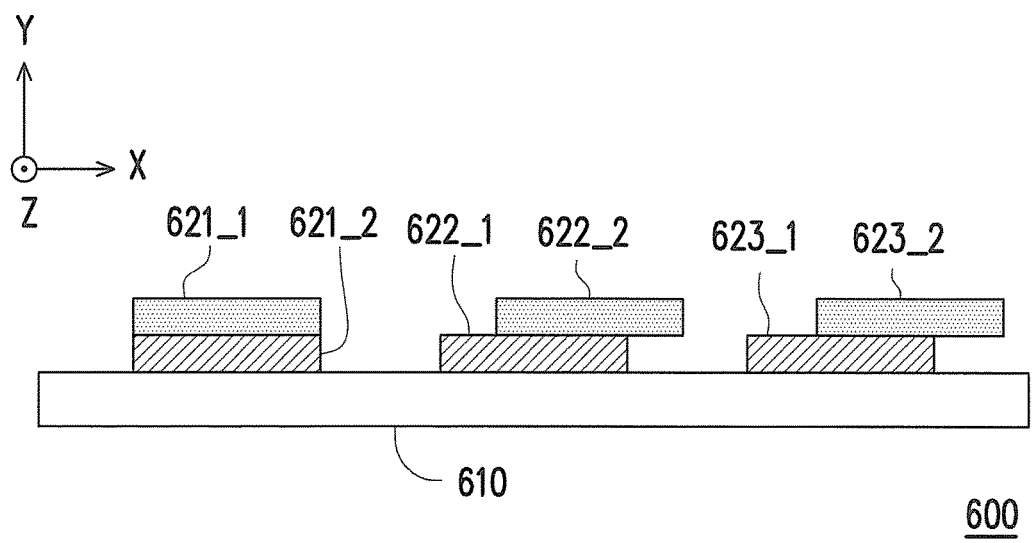
FIG. 6B is a schematic side view of a testing three-dimensional object according to one of the exemplary embodiments.

FIG. 6A is a schematic top view of a testing three-dimensional object according to one of the exemplary embodiments. FIG. 6B is a schematic side view of a testing three-dimensional object according to an embodiment of the invention. With reference to FIG. 6A and FIG. 6B, in this example, it is given that a first cross-sectional pattern of a first sub-structure of a testing three-dimensional object 600 projected on the platform 110 is the same as a second cross-sectional pattern of a second sub-structure of the testing three-dimensional object 600 projected on the platform 110, and the second sub-structure is stacked on the first sub-structure in the normal direction (the Z axis direction) of the platform 110.

More specifically, first, with reference to FIG. 6A and FIG. 6B, the testing three-dimensional object 600 includes a plurality of correlation structures 621, 622, and 623, and a flat bottom plate 610. The correlation structures 621-623 respectively include a first sub-structure 621_1, a first sub-structure 622_1, and a first sub-structure 623_1 formed of the first forming material 20a, and the correlation structures 621-623 respectively include a second sub-structure 621_2, a second sub-structure 622_2, and a second sub-structure 623_2 formed of the second forming material 20b. In this exemplary embodiment, cross-sectional patterns of the first sub-structures 621_1-623_1 and the second sub-structures 621_2-623_2 are respectively in a cross shape. However, it should be noted that the disclosure is not limited thereto. As shown in FIG. 6A, according to the preset calibration model, the first sub-structures and the second sub-structures of the correlation structures 621-623 have different joint levels, and the correlation structures 621-623 respectively correspond to different compensation parameters.

Thus, according to the joint levels of the correlation structures 621-623, one of the correlation structures 621-623, which has the highest joint level, is selected as the best correlation structure. To be more specific, in this example, the controller 130 or the operator of the three-dimensional printing apparatus 100 determines the joint levels between the first sub-structures 621_1-623_1 and the second sub-structures 621_2-623_2 of the correlation structures 621-623 according to coverage rates of the second sub-structures 621_2-623_2 stacked on the first sub-structures 621_1-623_1 in the correlation structures 621-623. It is known that the joint level increases as the coverage rate increases.

Accordingly, in this example, because the second sub-structure 621_2 of the correlation structure 621 completely covers the first sub-structure 621_1, the correlation structure 621 has the highest joint level. The correlation structure 621 is deemed as the best correlation structure, and the printing coordinates of the first nozzle 121 and the second nozzle 122 are compensated and calibrated according to the compensation parameter corresponding to the correlation structure 621.

Figure 7:
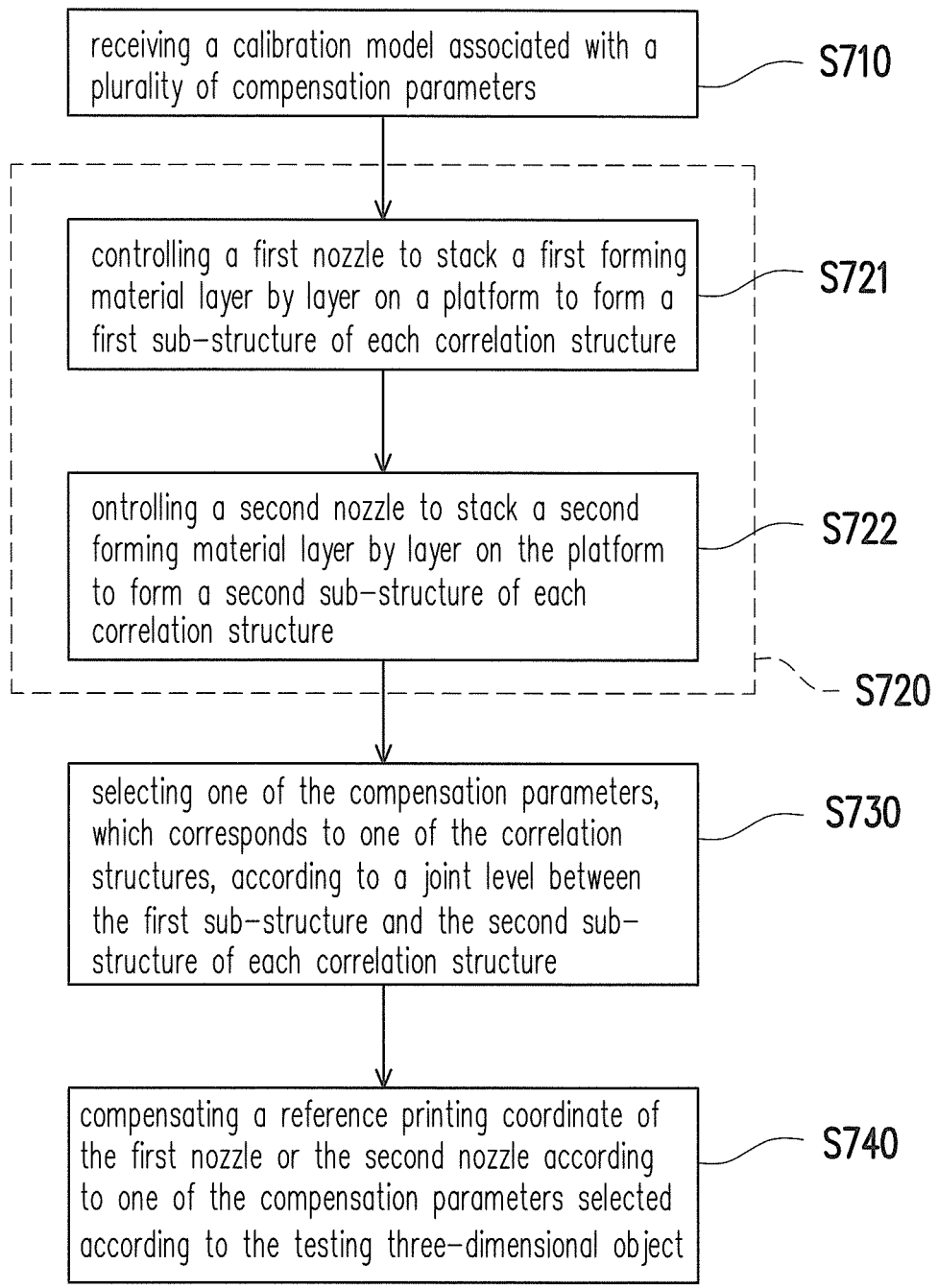
FIG. 7 is a flowchart illustrating a method of compensating a coordinate offset of a nozzle according to one of the exemplary embodiments.

Based on the descriptions of FIG. 1 to FIG. 6B, FIG. 7 is a flowchart illustrating a method of compensating a coordinate offset of a nozzle according to one of the exemplary embodiments. With reference to FIG. 2 and FIG. 7, the coordinate offset compensating method is adapted for calibrating printing coordinates of a plurality of nozzles and includes the following steps. In Step S710, the controller 130 receives a calibration model which is associated with a plurality of compensation parameters. Each compensation parameter corresponds to an offset value between the first nozzle and the second nozzle under a reference printing coordinate. In Step S720, the controller 130 controls the first nozzle 121 and the second nozzle 122 to print a testing three-dimensional object on the platform 110 according to the calibration model. The testing three-dimensional object includes a plurality of correlation structures respectively corresponding to the compensation parameters. Each of the correlation structures includes a first sub-structure and a second sub-structure, and the first sub-structure is formed of the first forming material 20a and the second sub-structure is formed of the second forming material 20b.

Step S720 may be divided into sub-steps S721 and S722. First, the controller 130 controls the first nozzle 121 to stack the first forming material 20a layer by layer on the platform 110, so as to form the first sub-structure of each correlation structure (Step S721). Then, the controller 130 controls the second nozzle 122 to stack the second forming material 20b layer by layer on the platform 110, so as to form the second sub-structure of each correlation structure (Step S722). In Step S730, the controller 130 selects one of the compensation parameters, which corresponds to one of the correlation structures, according to the joint level between the first sub-structure and the second sub-structure of each correlation structure. Thereafter, in Step S740, the controller 130 compensates the reference printing coordinate of the first nozzle 121 or the second nozzle 122 according to one of the compensation parameters selected according to the testing three-dimensional object. In other words, the controller 130 uses the compensation parameter corresponding to the best correlation structure to calibrate the printing coordinate of the first nozzle or the second nozzle.

To conclude the above, in one of the exemplary embodiments, the correlation structure of the testing three-dimensional object is formed using different forming materials, and the different forming materials are respectively fed and applied on the platform through different nozzles. The correlation structures have different preset joint levels according to the calibration model and respectively correspond to different compensation parameters. Thus, by observing the actual joint levels of the correlation structures, the printing coordinates of different nozzles can be calibrated and compensated according to the compensation parameter that conforms to the current condition. With the first sub-structure and the second sub-structure that present multi-layer structures, the operator or the three-dimensional printing apparatus can identify the offset errors of the nozzles more accurately and quickly. Therefore, improper bonding, such as displacement and overlap, which occurs at the joint between different forming materials due to nozzle offset is improved to enhance the printing quality and printing yield of the three-dimensional printing apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A coordinate offset compensating method for compensating a coordinate offset between nozzles, the coordinate offset compensating method being adapted for controlling a first nozzle and a second nozzle to perform coordinate offset compensation on a platform, wherein the first nozzle is configured to feed a first forming material and the second nozzle is configured to feed a second forming material, and the coordinate offset compensating method comprising:

receiving a calibration model associated with a plurality of compensation parameters, wherein each of the compensation parameters is corresponding to an offset value between the first nozzle and the second nozzle under a reference printing coordinate and comprises a first vector compensation parameter corresponding to a first direction and a second vector compensation parameter corresponding to a second direction, and the first direction and the second direction are perpendicular to a normal direction of the platform respectively;

controlling the first nozzle and the second nozzle to print a testing three-dimensional object on the platform according to the calibration model, wherein the testing three-dimensional object comprises a plurality of correlation structures respectively corresponding to the compensation parameters, wherein each of the correlation structures comprises a first sub-structure and a second sub-structure, and the first sub-structure is formed of the first forming material and the second sub-structure is formed of the second forming material, and each of the first sub-structure and the second sub-structure comprises a portion extending in the first direction and a portion extending in the second direction;

selecting one of the compensation parameters, which corresponds to one of the correlation structures, according to a joint level between the first sub-structure and the second sub-structure of each of the correlation structures; and compensating the reference printing coordinate of the first nozzle or the second nozzle according to the one of the compensation parameters selected according to the testing three-dimensional object.

2. The coordinate offset compensating method according to claim 1, wherein before the step of controlling the first nozzle and the second nozzle to print the testing three-dimensional object on the platform according to the calibration model, the coordinate offset compensating method further comprises:

controlling the first nozzle to print a flat bottom plate of the testing three-dimensional object on the platform according to the calibration model.

3. The coordinate offset compensating method according to claim 1, wherein the step of controlling the first nozzle and the second nozzle to print the testing three-dimensional object on the platform according to the calibration model comprises:

controlling the first nozzle to stack the first forming material layer by layer on the platform to form the first sub-structure of each of the correlation structures, wherein the first sub-structure comprises a plurality of first layer objects; and controlling the second nozzle to stack the second forming material layer by layer on the platform to form the second sub-structure of each of the correlation structures, wherein the second sub-structure comprises a plurality of second layer objects.

4. The coordinate offset compensating method according to claim 3, wherein the number of the first layer objects and the number of the second layer objects are respectively greater than or equal to 10.

5. The coordinate offset compensating method according to claim 1, wherein a first cross-sectional pattern of the first sub-structure projected on the platform is the same as a second cross-sectional pattern of the second sub-structure projected on the platform, and the second sub-structure is stacked on the first sub-structure in the normal direction of the platform.

6. The coordinate offset compensating method according to claim 5, wherein the step of selecting one of the compensation parameters, which corresponds to one of the correlation structures, according to the joint level between the first sub-structure and the second sub-structure of the correlation structure comprises:

determining the joint level between the first sub-structure and the second sub-structure of each correlation structure according to a coverage rate of the second sub-structure stacked on the first sub-structure in each correlation structure, wherein the joint level increases as the coverage rate increases; and selecting one of the correlation structures, which has the highest joint level, as a best correlation structure according to the joint level of each correlation structure.

7. The coordinate offset compensating method according to claim 1, wherein a first cross-sectional pattern of the first sub-structure projected on the platform is different from a second cross-sectional pattern of the second sub-structure projected on the platform, and the first sub-structure and the second sub-structure are adjacent to each other and respectively stacked on a carrier surface of the platform.

8. The coordinate offset compensating method according to claim 7, wherein the step of selecting one of the compensation parameters, which corresponds to one of the correlation structures, according to the joint level between the first sub-structure and the second sub-structure of the correlation structure comprises:

determining the joint level between the first sub-structure and the second sub-structure of each correlation structure according to a testing distance between a first reference point of the first sub-structure and a second reference point of the second sub-structure, wherein the joint level increases as the testing distance decreases; and selecting one of the correlation structures, which has the highest joint level, as a best correlation structure according to the joint level of each correlation structure.

9. A three-dimensional printing apparatus, comprising:

a platform comprising a carrier surface;

a printing module disposed above the platform and comprising:

a first nozzle configured to feed a first forming material;

a second nozzle configured to feed a second forming material; and a base carrying the first nozzle and the second nozzle and configured to move along a reference plane and along a normal direction of the reference plane; and a controller coupled to the printing module and receiving a calibration model, wherein the controller controls the printing module to print a testing three-dimensional object on the platform according to the calibration model; the calibration model is associated with a plurality of compensation parameters and comprises a first vector compensation parameter corresponding to a first direction and a second vector compensation parameter corresponding to a second direction, and the first direction and the second direction are perpendicular to a normal direction of the platform respectively; each of the compensation parameters corresponds to an offset value between the first nozzle and the second nozzle under a reference printing coordinate; the testing three-dimensional object comprises a plurality of correlation structures respectively corresponding to the compensation parameters associated with the calibration model; and each of the correlation structures comprises a first sub-structure and a second sub-structure, wherein each of the first sub-structure and the second sub-structure comprises a portion extending in the first direction and a portion extending in the second direction, wherein the controller controls the first nozzle to stack the first forming material layer by layer on the platform to form the first sub-structure of each correlation structure and controls the second nozzle to stack the second forming material layer by layer on the platform to form the second sub-structure of each correlation structure.

10. The three-dimensional printing apparatus according to claim 9, wherein the controller compensates the reference printing coordinate of the first nozzle or the second nozzle according to one of the compensation parameters selected according to the testing three-dimensional object.

11. The three-dimensional printing apparatus according to claim 9, wherein the correlation structures are respectively stacked on the carrier surface of the platform at equal intervals.

* * * * *